(12) United States Patent
Pejcinovic et al.

(10) Patent No.: US 11,828,695 B2
(45) Date of Patent: Nov. 28, 2023

(54) SURFACE CHARACTERIZATION OF POROUS SOLIDS AND POWDER MATERIALS USING FLOWING GAS

(71) Applicant: HORIBA Instruments, Incorporated, Irvine, CA (US)

(72) Inventors: Miroslav Pejcinovic, Lake Forest, CA (US); Jeffrey Taylor Bodycomb, Holmdel, NJ (US)

(73) Assignee: HORIBA Instruments Incorporated, Irvine, CA (US)

( * ) Notice: Subject to any disclaimer, the term of this patent is extended or adjusted under 35 U.S.C. 154(b) by 490 days.

(21) Appl. No.: 17/065,464

(22) Filed: Oct. 7, 2020

(65) Prior Publication Data

US 2021/0018422 A1 Jan. 21, 2021

Related U.S. Application Data

(62) Division of application No. 15/971,714, filed on May 4, 2018, now Pat. No. 11,099,115.

(51) Int. Cl.
*G01N 15/08* (2006.01)
*G01N 7/04* (2006.01)
(Continued)

(52) U.S. Cl.
CPC ............ *G01N 15/088* (2013.01); *G01N 7/04* (2013.01); *G01N 15/0893* (2013.01);
(Continued)

(58) Field of Classification Search
CPC .... G01N 15/088; G01N 7/04; G01N 15/0893; G01N 27/18; G01N 30/66; G01N 2015/0833; G01N 2015/0873
See application file for complete search history.

(56) References Cited

U.S. PATENT DOCUMENTS 3,211,006 A 10/1965 Haley, Jr.
3,555,912 A * 1/1971 Lowell ............... G01N 15/0893
73/865.5

(Continued)

FOREIGN PATENT DOCUMENTS

GB 831639 A 3/1960
GB 1419214 A 12/1975

OTHER PUBLICATIONS

International Preliminary Report on Patentability dated Nov. 19, 2020 for related PCT Application No. PCT/US2019/17569; 12 Pg.

(Continued)

*Primary Examiner* — David Z Huang
(74) *Attorney, Agent, or Firm* — BROOKS KUSHMAN PC

(57) ABSTRACT

A method for surface characterization of a porous solid or powder sample using flowing gas includes a controller that controls mass flow of a carrier gas and an adsorptive gas to form a mixture having a target concentration of the adsorptive gas over the sample, determining adsorptive gas concentration based on signals from a detector disposed downstream of the sample, automatically repeating the controlling and determining steps for a plurality of different target concentrations, and generating an isotherm for the sample based on the adsorptive gas concentration for the plurality of different target concentrations. The method may include immersing the sample in liquid nitrogen to cool the sample for all, or at least a portion of each of the different target concentrations. The target concentrations may vary from less than 5% to greater than 95%, and may vary in a stepwise manner.

28 Claims, 6 Drawing Sheets

(51) Int. Cl.
  *G01N 30/66* (2006.01)
  *G01N 27/18* (2006.01)
(52) U.S. Cl.
  CPC ............. *G01N 27/18* (2013.01); *G01N 30/66* (2013.01); *G01N 2015/0833* (2013.01); *G01N 2015/0873* (2013.01)

(56) References Cited

U.S. PATENT DOCUMENTS

| | | | |
|---|---|---|---|
| 3,843,489 | A | 10/1974 | Sandler |
| 3,864,959 | A | 2/1975 | MacDonald |
| 4,057,755 | A | 11/1977 | Piesche |
| 4,149,402 | A | 4/1979 | Manes |
| 4,489,593 | A | 12/1984 | Pieters et al. |
| 4,947,677 | A * | 8/1990 | Frye .................... G01N 29/022 73/38 |
| 5,065,634 | A | 11/1991 | Jennings |
| 5,133,219 | A | 7/1992 | Camp |
| 5,342,580 | A | 8/1994 | Brenner |
| 2004/0134258 | A1 * | 7/2004 | Wang ...................... G01N 7/04 73/865.5 |
| 2006/0005608 | A1 | 1/2006 | Kitzhoffer |
| 2016/0076988 | A1 | 3/2016 | Matsukata et al. |

OTHER PUBLICATIONS

Journal of Chromatography Library; The Thermal Conductivity Detector (TCD); pp. 39-58; vol. 4; 1976.

Horiba; Applications Data Sheet; ADS129; SA-9600 Series, A Comparison of Single Point Surface Area Measurement to Multi Point Determination; BET Surface Area; Particle Characterization Analyzer; pp. 1-2; 2011.

Jim Williams; Thermal Techniques in Measurement and Control Circuitry; Linear Technology; Application Note 5; pp. 1-8; Dec. 1984.

Horiba Scientific; Quick Start Guide for SA-9600 Series Surface Analyzer Multi-Point Measurement; pp. 1-47; 2010.

Horiba Scientific; Quick Start Guide for SA-9600 Series Surface Analyzer Single Point Measurement; pp. 1-46; 2010.

Horiba Scientific; SA-9600 Surface Area Software Manual Version 4.0; 21 Pages; downloaded from http://www.horiba.com/scientific/products/particle-characterization/surface-area-analysis/details/sa-9600-series-938/ on Apr. 1, 2017.

International Search Report and Written Opinion for International Application No. PCT/US2019/17569 dated Jun. 3, 2019.

Extended European Search Report dated Jan. 10, 2022 for related Application No. 19796986.8; 10 Pgs.

Badalyan Alexander et al: "Development of an automated gas adsorption apparatus for the characterization of the surface area, pore size distribution, and density of powdered materials", Review of Scientific instruments, vol. 72, Jul. 1, 2001, pp. 3038-3045.

China Office Action dated Feb. 22, 2022 for related Application No. 201980030276.5; 6 Pages.

Japan Office Action dated Aug. 25, 2022 for related Japanese Application No. 2020-561624; 3 Pages.

Korea Office Action dated Apr. 28, 2023 for related Korea Application No. 10-2020-7034756; 7 Pages.

* cited by examiner

SURFACE CHARACTERIZATION OF POROUS SOLIDS AND POWDER MATERIALS USING FLOWING GAS

CROSS-REFERENCE TO RELATED APPLICATIONS

This application is a division of U.S. application Ser. No. 15/971,714 filed on May 4, 2018, the disclosure of which is hereby incorporated by reference in its entirety.

TECHNICAL FIELD

The present disclosure relates to a system and method for surface characterization (surface area, pore volume, pore volume distribution, etc.) of porous solids and powder materials using flowing gas.

BACKGROUND

There are variety of different methods and techniques available for the characterization of the exposed surfaces of materials based on the gas sorption of an adsorptive gas on the sample material. In these measurements, a known amount of sample material is cooled and the amount of adsorptive gas adsorbed onto the cold surface as a function of gas (partial) pressure is determined to develop an associated isotherm for the sample. The amount of adsorbed gas and the shape of the isotherm is a function of the surface area and porosity of the sample. Therefore, the isotherm can be used to characterize the material surface.

The most prominent devices for characterizing these samples use static volumetric techniques. While the present disclosure is directed to systems and methods for surface characterization that use a flowing gas mixture rather than a static volumetric technique, an overview of the static volumetric technique may be helpful for a better understanding of the flowing gas mixture techniques described in greater detail herein.

The current state of the art static volumetric physisorption/chemisorption measurement method for surface characterization of porous and powder materials (adsorption and/or desorption isotherm determination) adds and removes a known amount of the adsorptive gas to and from a sample cell, respectively, containing a measured amount of sample material. The amount of the gas added/removed is adjusted to ensure the sample cell reaches a target gas pressure. The isothermal curve is obtained by plotting the amount of gas added/removed as a function of gas pressure.

Because the static volumetric technique relies on the purity of the adsorptive gas, this approach requires measurement instruments capable of producing ultra-high vacuum (UHV), with a pressure less than or equal to $10^{-9}$ Torr, inside the system before beginning the measurement. Some state of the art instruments can generate a vacuum of $10^{-11}$ Torr. This UHV adds complexity to the apparatus, making it prone to leaks, difficult to operate, and expensive to maintain. In most cases, particularly due to the complexity of UHV systems (for example, multi-stage pumps and extreme cleanliness requirements), these systems require expertise to operate, and the measurement process is time consuming.

In the flowing gas technique, a gas mixture is allowed to flow over a sample, or through the sample. Typically, this mixture has two gases, an adsorptive gas (such as nitrogen or argon) and a carrier gas (such as helium or hydrogen). The carrier gas does not interact with the sample or the adsorptive gas, but increases the total gas pressure.

In the static volumetric technique, the adsorptive gas pressure is used as the x-axis of the isotherm. In the flowing gas technique, the adsorptive gas partial pressure is equivalent to the adsorptive gas pressure in the static volumetric technique. Note that if the ideal gas law is not met (for example if the total gas pressure is over five atmospheres), other relationships can be established to make the measurement equivalent. The adsorptive gas partial pressure is modified by changing the relative amount of adsorptive gas in the mixture. As the sample adsorbs and desorbs gas, the concentration of gas downstream of the sample is reduced and increased, respectively. This change in gas concentration is monitored, typically using a thermal conductivity detector (TCD). The resulting change in concentration over time is integrated to find the mass of gas adsorbed and desorbed and that information is used to construct an associated isotherm.

Current state of the art methods using the flowing gas technique are relative methods. The relative methods determine the amount of adsorbate by comparing the signal produced by the adsorptive gas adsorbed/desorbed by the measured sample material, to the signal produced by the known amount of the adsorptive gas introduced to the system before or after the measurement step. Because there is no calculation directly relating the concentrations and flow rates of the gas mixture to the amount of the adsorptive gas adsorbed/desorbed by the sample, the current state of the art methods and apparatus using the flowing gas techniques and thermal conductivity detectors are generally considered inferior to state of the art static volumetric techniques, which have therefore become the recognized standard for industry and research activities.

One advantage of the flowing gas technique is the ability to control the partial pressure of the adsorptive gas, by controlling the gas mixture concentration. Based on Dalton's law, the total pressure of the gas mixture equals the sum of the partial pressures of the mixture components. If the components of the mixture are at the same temperature, the partial pressure of each component is directly determined by the volumetric concentration of that component in the mixture.

While flowing gas systems can be operated at any pressure, atmospheric pressure is often the most convenient choice, in part due to cost considerations. As such, the flowing gas systems are generally open to atmosphere downstream from the measurement cell with the overall system pressure close to atmospheric pressure (typically within about 5 millibar). Therefore, these systems are less prone to leaks compared to UHV static volumetric systems, and generally have significantly lower initial cost and operating costs. Another advantage of flowing gas systems relative to static volumetric systems is faster measurement acquisition because the sample can be brought directly to the target (partial) gas pressure.

While attempts have been made to obtain a complete adsorption/desorption isotherm by flowing a gas mixture of an adsorptive gas and a carrier gas through the measurement system at substantially atmospheric pressure, these systems have not performed well enough over the required range of partial pressures (about 0 to 760 torr) to determine a complete isotherm. In addition, existing systems do not change the adsorptive gas concentration during the adsorption or desorption steps of the measurement. The present inventors have recognized that this may result in plugging of the surface pores of the sample rather than filling of the surface pores with adsorptive gas at higher gas concentrations. This plugging effect prevents regular measurement of the full isotherm. In addition, the existing systems typically use a nitrogen injection to calibrate the TCD. This calibration assumes that the detector is completely linear over the entire measurement range, which may result in measurement error as constant voltage TCDs used in these systems are generally not linear over such a wide concentration range.

SUMMARY

In various embodiments, a system for surface characterization of a porous solid or powder sample using flowing gas includes a first mass flow controller configured to deliver a controllable mass flow of a carrier gas, a second mass flow controller configured to deliver a controllable mass flow of an adsorptive gas, a mixer having an input coupled to the first and second mass flow controllers and configured to deliver a mixture of the carrier gas and the adsorptive gas to at least a first measurement channel, a first flow control device coupled to the mixer, a first sample cell disposed within the first measurement channel, the first sample cell configured to contain a first amount of the sample and flow the mixture over or through the first amount of the sample, a first chiller configured to selectively cool the first sample cell, a first concentration detector coupled downstream of the first sample cell and configured to provide a signal indicative of adsorptive gas concentration in the mixture downstream of the first sample cell, and a controller coupled to the first and second mass flow controllers and the first concentration detector, the controller configured to control the first and second mass flow controllers to deliver a target concentration of the adsorptive gas in the mixture to the first sample cell and to determine an amount of the adsorptive gas adsorbed and desorbed by the sample based on signals from the first concentration detector. In one or more embodiments, the controller is configured to vary the target concentration of adsorptive gas in the mixture from 0% to greater than 95% and/or near 100%.

In one or more embodiments, a system for surface characterization of a porous solid or powder sample using flowing gas includes a first mass flow controller configured to deliver a controllable mass flow of a carrier gas, a second mass flow controller configured to deliver a controllable mass flow of an adsorptive gas, and a mixer having an input coupled to the first and second mass flow controllers and configured to deliver a mixture of the carrier gas and the adsorptive gas to at least a first measurement channel. Each measurement channel is coupled to the mixer and includes a capillary tube, a sample cell configured to contain an amount of the sample and flow the mixture over or through the sample, a dewar configured to contain liquid nitrogen and positionable to selectively immerse the sample cell in the liquid nitrogen, a concentration detector coupled downstream of the sample cell and configured to provide a signal indicative of adsorptive gas concentration in the mixture downstream of the sample cell, a delay loop, a valve configured to selectively route the mixture to either the concentration detector or the delay loop, a flow meter coupled to the concentration detector, and an atmospheric buffer coupled to the flow meter and atmosphere. A controller is coupled to the first and second mass flow controllers, and the concentration detector of each of the plurality of measurement channels. The controller is configured to control the first and second mass flow controllers to deliver a varying target concentration of the adsorptive gas in the mixture to the sample cell of each of the plurality of measurement channels and to determine an amount of the adsorptive gas adsorbed and desorbed by each sample cell in the plurality of measurement channels based on signals from the concentration detector in each of the plurality of measurement channels.

In other embodiments, a method for characterization of a porous solid or powder sample using flowing gas includes, by a controller, controlling mass flow of a carrier gas and an adsorptive gas to form a mixture having a target concentration of the adsorptive gas over the sample, determining adsorptive gas concentration based on signals from a detector disposed downstream of the sample, repeating the controlling and determining steps for a plurality of different target concentrations, and generating an isotherm for the sample based on the adsorptive gas concentration for the plurality of different target concentrations.

Systems and methods according to various embodiments of the present disclosure may provide a number of advantages. For example, embodiments according to the disclosure may be used to perform an absolute measurement of the adsorbate amount rather than a relative measurement. Furthermore, measurements according to various embodiments do not require the injection of a reference amount of gas for calibration prior to measurement. Various embodiments utilize closed loop feedback mass flow controllers to mix the adsorptive gas and the carrier gas at any desired concentration between 0% (pure carrier gas) and 100% (pure adsorptive component) with an accuracy and repeatability of 0.1% or better to obtain a complete adsorption/desorption isotherm. One or more embodiments provide the capability for direct adsorbate measurements as well as differential measurements that compare values associated with the measurement cell to values associated with a reference cell containing a different amount of the same sample material, which may be none, i.e. an empty reference cell.

Various embodiments incorporate a thermal conductivity detector that is sensitive only to the gas mixture concentration. The detector response time to changes in concentration is substantially instantaneous, which assures that the measurement signals obtained in static and dynamic concentration conditions are substantially the same, and reduces measurement time required to obtain a complete isotherm. Changing the adsorptive gas concentration during the adsorption or desorption steps of the measurement according to one or more embodiments of the disclosure reduces or prevents plugging of surface pores of the sample to facilitate regular measurement of the full isotherm with improved accuracy.

Embodiments according to the disclosure provide control of the partial pressure of the adsorptive gas by controlling the gas mixture ratio, while keeping the total pressure essentially the same as the atmospheric pressure. Due to small pressure differences of the system pressure relative to atmosphere the cost of building the measurement system is significantly lower than systems with high vacuum or increased pressure requirements.

Flowing gas mixture techniques for surface area characterization according to one or more embodiments of the present disclosure provide results significantly faster than static volumetric techniques because the carrier gas effectively fills the space which is not taken by the adsorptive gas eliminating the need for vacuum creation, while simultaneously purging the controlled volume leading to faster equilibration.

The above advantages and other advantages and features of the present disclosure will be readily apparent from the following detailed description of the preferred embodiments when taken in connection with the accompanying drawings.

DETAILED DESCRIPTION

Figure 1:
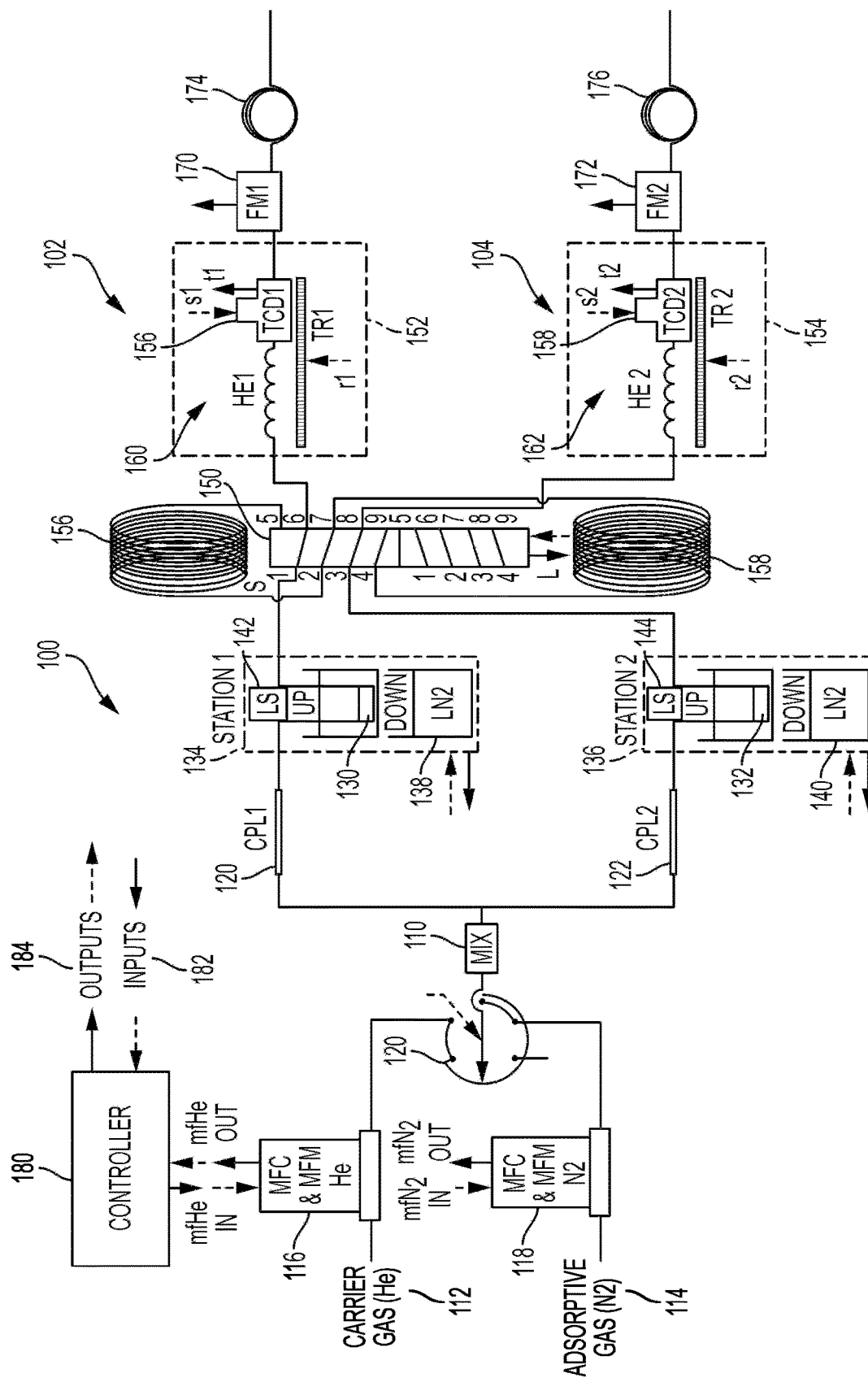
FIG. 1 is a simplified block diagram illustrating a representative embodiment of a system or method for surface characterization (surface area, pore volume, pore volume distribution, etc.) of porous solids and powder materials using flowing gas according to the present disclosure.

Various representative embodiments of systems and methods according to the present disclosure are described in detail. However, it is to be understood that the representative embodiments are merely examples and systems and methods according to the present disclosure may be embodied in various and alternative forms. The figures are not necessarily to scale and some features may be exaggerated or minimized to show details of particular components. Therefore, specific structural and functional details disclosed herein are not to be interpreted as limiting, but merely as a representative basis for teaching one of ordinary skill in the art to variously employ the claimed subject matter. Simplified flowcharts or block diagrams may be provided to illustrate operation of a representative embodiment of a system or method. Those of ordinary skill in the art will appreciate that the order of steps or processes may not be required for particular applications, that some steps may have been omitted for ease of illustration and description, and that steps or processes may be repeated individually and/or as a subset of the illustrated steps or processes. Likewise, all illustrated or described steps may not be needed to provide one or more of the advantages described herein.

As those of ordinary skill in the art will also understand, various features of the present disclosure as illustrated and described with reference to any one of the Figures may be combined with features illustrated in one or more other Figures to produce embodiments of the present disclosure that are not explicitly illustrated or described. The combinations of features illustrated provide representative embodiments for typical applications. However, various combinations and modifications of the features consistent with the teachings of the present disclosure may be desired for particular applications or implementations.

As used herein, adsorption refers to enrichment of the adsorptive gas at the external and accessible internal surfaces of a solid material. Physisorption refers to weak bonding of the adsorbate, reversible by small changes in pressure or temperature. Adsorbate refers to the gas adsorbed by the sample. Adsorptive refers the gas or vapor to be adsorbed. Adsorbent refers to a solid material (sample) on which adsorption occurs. An isotherm refers to the relationship between the amount of gas adsorbed and the equilibrium pressure of the gas, at constant temperature. The volume adsorbed refers to the volumetric equivalent of adsorbed amount expressed as gas at standard conditions of temperature and pressure (STP). The adsorbed amount refers to quantity of gas adsorbed at a given pressure and temperature. Relative pressure refers to a ratio of the equilibrium adsorption pressure, p, to the saturation vapor pressure, $p_0$, at a designated analysis temperature. The equilibrium adsorption pressure refers to pressure of the adsorptive gas in equilibrium with the adsorbate. The saturation vapor pressure refers to vapor pressure of the bulk liquefied adsorptive gas at the temperature of adsorption. The controlled volume refers to a fixed, or uniformly moving, volume at which mass continuity equations are applied. The dead volume refers to the volume of the controlled volume not occupied by the sample.

A simplified block diagram illustrating a representative embodiment of a system or method for surface characterization (surface area, pore volume, pore volume distribution, etc.) of porous solids and powder materials using flowing gas is shown in FIG. 1. System 100 includes two substantially identical flow channels, indicated generally at 102 and 104. Other embodiments may include any number of flow channels that may be similarly configured, or groups or sets of flow channels may be matched or equally configured with other groups or sets having different matched configurations.

System 100 includes a gas mixer 110, which provides a mixture of carrier gas 112 (helium in this example) and adsorptive gas 114 (nitrogen in this example) to provide a gas mixture containing a target concentration of adsorbent gas at a constant volumetric flow rate controlled using closed loop feedback by associated mass flow controllers (MFC) and mass flow meters (MFM) 116, 118. The mass flow controllers 116, 118 may communicate with a microprocessor-based computer control system or controller 180 with feedback provided by associated mass flow meters to precisely control the amount of each gas needed to create the desired mixture for measurements used to generate an isotherm. An optional calibration valve 120 may be provided to flow pure carrier gas 112, pure adsorptive gas 114, or a mixture of the gases. Calibration valve 120 may also communicate with controller 180.

While illustrated with a single controller 180, system 100 may include any number of controllers or modules directly connected, or coupled via a network, to associated system actuators and sensors. Controller 180 may be configured or programmed to perform a method for characterizing a sample material as described herein by communicating with and/or controlling one or more components of system 100. Controller 180 may include a microprocessor in communication with volatile and non-transitory or persistent memory or other computer readable media for storing program instructions, data, and measurement results. Representative measurement techniques described herein may be implemented by a corresponding control strategy and/or logic for system 100 implemented by one or more controllers, such as controller 180, using one or more processing strategies such as event-driven, interrupt-driven, multi-tasking, multi-threading, and the like. As such, various steps or functions illustrated and described herein may be performed in the sequence illustrated, in parallel, in a different sequence, or in some cases omitted. Although not always explicitly illustrated, one of ordinary skill in the art will recognize that one or more of the illustrated steps or functions may be repeatedly performed depending upon the particular processing strategy being used and measurement being performed. Similarly, the order of processing is not necessarily required to achieve the features and advantages described, but is provided for ease of illustration and description. The control logic may be implemented primarily in software executed by a microprocessor-based controller configured to perform the illustrated task or function. Of course, the control logic may be implemented in software, hardware, or a combination of software and hardware in one or more controllers or processors depending upon the particular application. When implemented in software, the control logic may be provided in one or more non-transitory computer-readable storage devices or media having stored data representing code or instructions executed by a processor or computer.

As generally illustrated in FIG. 1, controller 180 may communicate directly or via a network with various components of system 100 using controller inputs 182 and outputs 184. As will be appreciated by those of ordinary skill in the art, inputs 182 of controller 180 correspond to outputs of various system components, such as flow meters, level sensors, valve position sensors, temperature sensors, etc. Similarly, outputs 184 of controller 180 correspond to inputs for associated actuators, such as mass flow controllers, dewar position motors, valves, heaters, etc. Inputs and outputs may be provided as analog and/or digital signals between controller 180 and associated components.

After flowing through calibration valve 120 (when provided) and mixer 110, the gas mixture is then split equally among all channels. In the representative embodiment illustrated, the gas mixture is split equally into flow paths 102, 104 using capillary tubes 120, 122, respectively, which are precisely matched for equal flow rates, and are substantially the same lengths. Alternatively, flow control valves may be used instead of the capillary tubes 120, 122. The gas mixture next passes through measurement cells 130, 132 at measurement stations 134, 136, respectively. Sample material may be placed in one or more of the measurement cells 130, 132. Adsorptive gas 114 is adsorbed or desorbed by the sample material within the measurement cells 130, 132. As described in greater detail below, a differential measurement may be performed by placing a first amount of sample material in cell 130 and a second amount of sample material in cell 132. Differential measurements may be performed with one of the measurement cells 130, 132 having no sample material.

The measurement cells 130, 132 at the stations 134, 136 can be cooled for gas adsorption. In the representative embodiment illustrated, measurement cells 130, 132 are cooled for gas adsorption by immersion in liquid nitrogen vessels 138, 140, respectively. After immersion, the liquid nitrogen level may be monitored by associated level sensors 142, 144 and maintained by an appropriate control system coupled to a measurement controller or computer (not shown). In one or more embodiments, a single liquid nitrogen vessel with a single level sensor may be used for all measurement cells. The measurement cells can be warmed for gas desorption, for example, by lowering the liquid nitrogen vessel(s) so that the measurement cells are exposed to room temperature. Alternatively, or in combination, the measurement cells can be heated for sample preparation (degassing) using associated heating devices (not shown).

After passing through sample cells 130, 132, the gas mixture passes through valve 150, where it is directed either directly to detectors 152, 154, or through buffer loops 156, 158, respectively. Buffer loops 156, 158 may be used to compensate for any flow rate fluctuation during the adsorption/desorption phase of the measurement step. Position of valve 150 may be electronically controlled by controller or computer 180. Detectors 152, 154 may be implemented using thermal conductivity detectors (TCD) 156, 158, also in communication with controller 180 to provide an associated signal representing the thermal conductivity of the gas mixture passing through the detector.

Detectors 152, 154 may also include associated and/or integrated heat exchangers or heating elements 160, 162, respectively. Heat exchangers 160, 162 may be used to stabilize the gas mixture to substantially match the temperature of the housing of TCDs 156, 158 to improve measurement accuracy. Flow meters 170, 172 provide a signal indicative of flow rate of the gas mixture through associated flow paths 102, 104, respectively, and may be used to determine the end of the adsorption/desorption step when buffer loops 156 and 158 are engaged. Atmospheric buffer loops 174, 176 reduce or prevent influence of outside air on the measurements while also protecting detectors 152, 154 from oxidation. Detectors 152, 154, heating elements or heat exchangers 160, 162, and flow meters 170, 172 may communicate with controller 180.

As illustrated in the representative embodiment of FIG. 1, one or more TCD's provide a signal indicative of output gas concentration to controller 180. The TCD measures the thermal conductivity of the output gas mixture by controlling and monitoring the heat energy transfer from the measurement element to the detector housing. In one or more embodiments, the TCD is designed in such a way that the mixture flow rate influence on the measurement signal is negligible. Any variations of the signal associated with the changing flow rate can be calculated and compensated for accordingly.

Figure 6A:
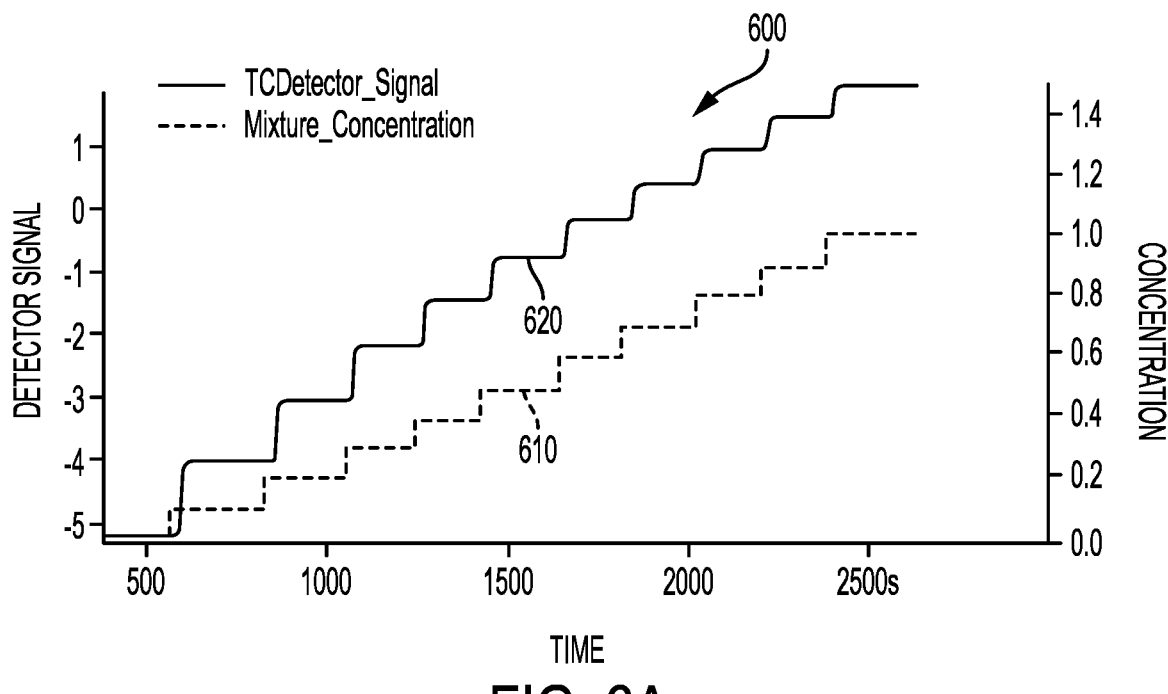
FIGS. 6A-6B illustrate detector calibration for a thermal conductivity detector according to representative embodiments of the present disclosure.
Figure 6B:
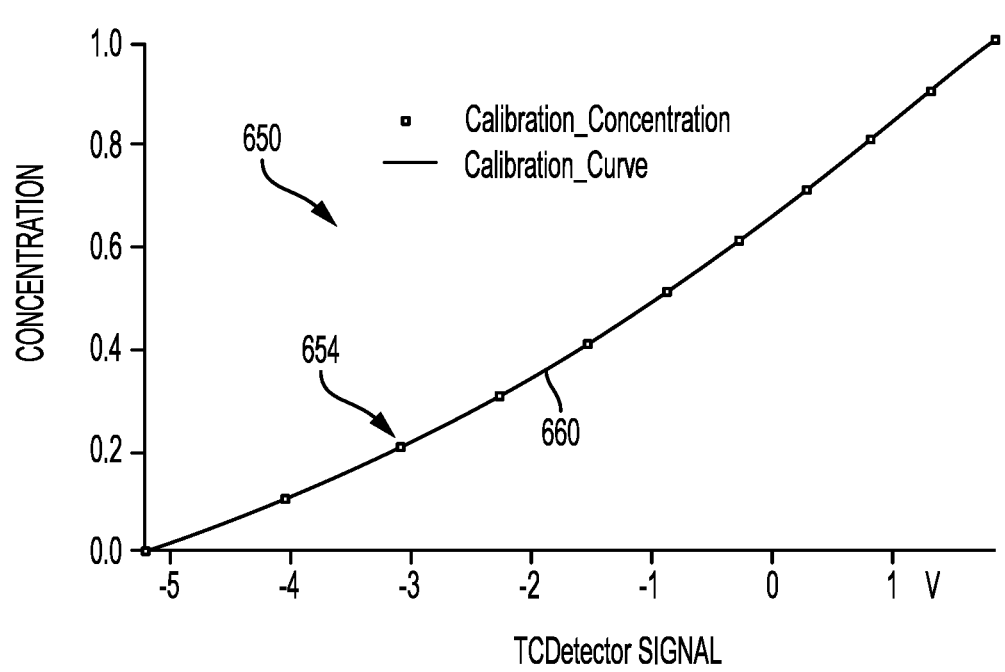

A TCD according to one or more embodiments of the present disclosure may include a detector element (filament), a temperature regulator (TR) or sensor, and a heat exchanger (HE) within a housing. An associated controller may be configured in cooperation with the temperature regulator to control power supplied to the detector and maintain a constant temperature of the detector element, the detector housing, and the incoming gas mixture. The measurement element control signal s, may additionally be used to enhance the control signal (r) of the temperature regulator (TR) using feed forward control. Temperature stability of all components of the detector according to embodiments of the present disclosure provides various advantages. First, heat radiation inside the detector is constant and therefore the effects of heat radiation on the measurement can be eliminated. Second, the TCD provides a rapid response to a change in concentration of the flowing output gas as the entirety of the energy transfer is associated with the gas conductivity (depending only on concentration of the gas) because there is no energy needed for temperature change of the detector measurement element (filament). This facilitates rapid, accurate, and precise measurements across the entire range of concentrations from 0% (pure carrier gas) to 100% (pure adsorptive gas). Detector signal calibration as described with reference to FIGS. 6A-B provides accurate values used for data integration, as well as for real time measurement process control using various closed loop control strategies including feedback and/or feedforward control. A more detailed illustration and description of a representative TCD and associated control system is provided herein with reference to FIG. 8.

FIGS. 2-5 illustrate operation of a system or method for characterizing a sample according to representative embodiments of the present disclosure. The controller determines the retained/released adsorbate gas for the sample using the following basic equations:

$$\left(\frac{dN2x}{dt}\right)_{Vx} = \iiint \frac{\partial Cx}{\partial s} * \vec{v} * dVx + \iiint \frac{\partial Cx}{\partial t} * dVx \quad 1)$$

$$\left(\frac{dN2x}{dt}\right)_{Vx} = \oiint Cx * \vec{v} * \vec{dAx} + \iiint \frac{\partial Cx}{\partial t} * dVx \quad 2)$$

$$MFinx * (1 - Cin) = MFoutx * (1 - Coutx) \quad 3)$$

(Equation 3 recognizes that carrier gas IN=carrier gas OUT)

$$Cin = \frac{N2in}{(N2in + Hein)} \quad 4)$$

$$MFoutx = MFinx * \frac{(1 - Cin)}{(1 - Cx)} \quad 5)$$

$$\left(\frac{dN2x}{dt}\right)_{Vx} = (MFoutx * Coutx - MFinx * Cin) - \left(\frac{dCoutx}{dt}\right)_{outx} * Vx \quad 6)$$

$$\left(\frac{dN2x}{dt}\right)_{Vx} = \quad 7)$$
$$\left(MFinx * \frac{(1 - Cin)}{(1 - Coutx)} * Coutx - MFinx * Cin\right) - \left(\frac{dCout}{dt}\right)_{outx} * Vx$$

$$\left(\frac{dN2x}{dt}\right)_{Vx} = MFinx * \frac{(Coutx - Ci)}{(1 - Coutx)} - \left(\frac{dCout}{dt}\right)_{outx} * Vx \quad 8)$$

$$N2x_{(Cout)} = \int_{tCoutStart}^{tCout} \left(MFinx * \frac{(Coutx - Cin)}{(1 - Cou)} - Vx * \left(\frac{dCoutx}{dt}\right)_{outx}\right) dt \quad 9)$$

$$N2x_{(Cout)} = \quad 10)$$
$$\int_{tCoutStart}^{tCout} \left(MFinx * \frac{(Coutx - Cin)}{(1 - Coutx)}\right) dt - Vx * \int_{CoutStart}^{Cout} dCoutx$$

$$C_{in}(t) = C_{mix}(t + \Delta t_{in}) \quad 11)$$

$$C_{out}(t) = C_{detector}(t - \Delta t_{out}) \quad 12)$$

where: x designates the measurement station or control volume,

N2x represents the total amount of adsorbate retained/released by/from the measured sample for measurement station x, Cx represents the local (place and time) concentration of the adsorptive component in the gas mixture for measurement station x, MFin$_x$ represents the mass flow rate of the gas mixture entering the controlled volume for measurement station x, Vx represents the controlled volume for measurement station x, Ax represents the boundary (in and out) surface of the controlled volume for measurement station x, t represents the measurement time variable m$_x$ represents the mass of the measured sample for measurement station x, and $$\frac{N2x(Cout)}{mx}$$

represents the amount of absorptive retained/released by/from the measured sample at the concentration Cout, per unit mass, for the controlled volume of measurement station x, $C_{mixer}$ represents concentration of the adsorptive component leaving the mixer $C_{detector}$ represents concentration of the adsorptive component measured by the detector Cin$_x$ represents the concentration of the adsorptive component in the gas mixture entering the controlled volume for measurement station x, Cout$_x$ represents the concentration of the adsorptive component in the gas mixture exiting the controlled volume for measurement station x, For the measurement cell being the controlled volume, the $C_{in}$ and $C_{out}$ may be derived from $C_{mixer}$ and $C_{detector}$ which are calculated directly from the saved signal values at the same time points. The channel volume between the mixer and the cell, and the channel volume between the cell and the detector are used to calculate the delays between the $C_{in}$ and $C_{mixer}$ and $C_{detector}$ and $C_{out}$.

In general, three factors determine the nature of the measurement that is performed: input concentration and flow rate, number of channels, and the flow path with related calculations. The number of options available for the measurement system for each of the three factors determines the total number of possible measurement options. In the representative embodiments described herein, input concentration and flow rate has three options (constant, stepwise, and continuous), the number of channels has two options (independent (also referred to as single channel) and differential), and the flow path has two options (direct or through buffer). Various combinations may be suited or useful for particular applications. Thus, there are twelve possible measurement options in the representative embodiments illustrated and described herein. In addition, the options can be combined. The options for each factor are described below, followed by an example of a representative combination.

1. Input Concentration and Flow Rate

System 100 of FIG. 1 is capable of producing gas mixtures with different concentrations at constant flow rates. With respect to the concentration, there are three options for performing a measurement step.

Figure 2:
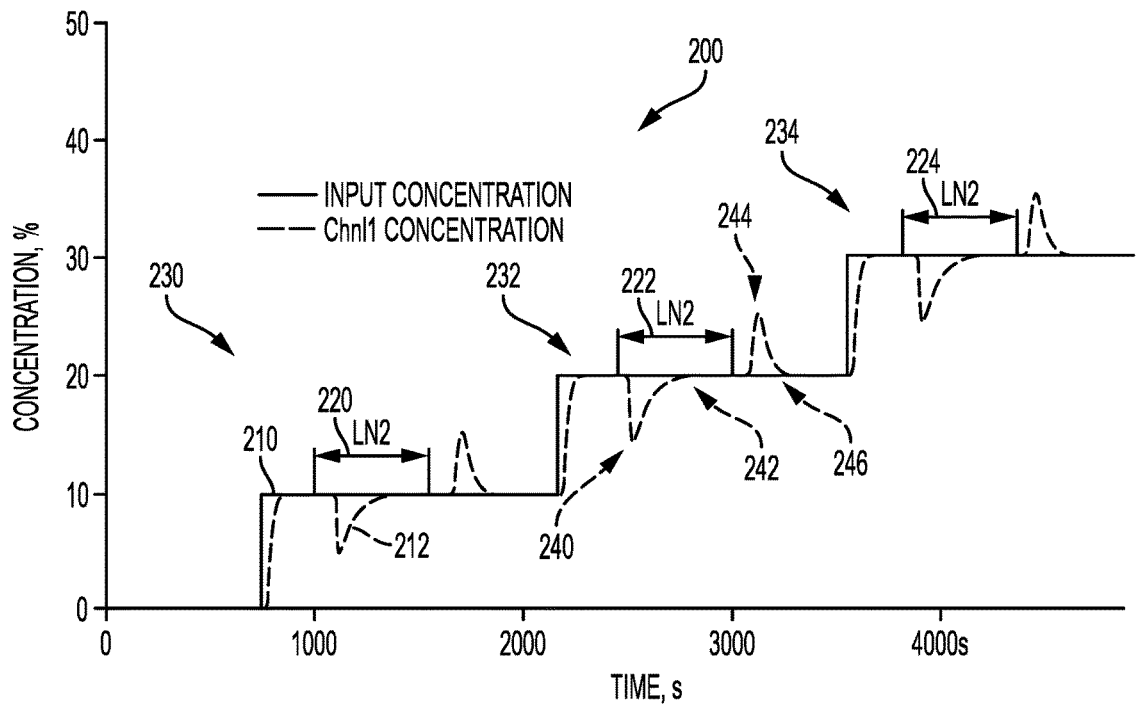
FIG. 2 is a graph illustrating a method for sample characterization using the system of FIG. 1 with a constant input gas concentration for the duration of each measurement step according to representative embodiments of the present disclosure.

1.1 Constant Input Gas Concentration During Adsorption/Desorption for Each Measurement Step This measurement option is illustrated in the graph of FIG. 2, with reference to the system of FIG. 1. The measurement cells 130, 132 are kept at a temperature well above the dew point of the adsorptive gas, for example room temperature prior to beginning the measurement. Output gas concentration is continuously monitored by detectors 152, 154. The input gas concentration is then selected and left constant for the duration of each of a plurality of measurement steps as shown in FIG. 2 as the temperature of the sample material is changed to provide adsorption and desorption of the adsorptive gas.

As shown in FIG. 2, graph 200 plots input gas mixture concentration 210 and output gas mixture concentration 212 as a function of time for a constant input gas concentration measurement with three concentration values or steps 230, 232, and 234. The temperature of the measurement cell(s) containing the sample material is lowered, for example by immersing in liquid nitrogen 138, 140 for at least a portion of the measurement step. The intervals 220, 222, and 224 marked with LN2 indicate when the measurement cell temperature is lowered. The other times during each constant input gas concentration period 230, 232, 234, the measurement cell is warmed, for example, to room temperature, by removing the measurement cell from the liquid nitrogen immersion. Alternatively, the measurement cell(s) may be heated to a desired temperature as previously described.

Once the cell temperature is lowered, the output gas concentration will decrease as gas is adsorbed by the sample material as generally indicated at 240. When adsorption is completed the output gas concentration will return to the set value as generally indicated at 242. At this time, the sample cell will be warmed and the output gas concentration will increase as gas is desorbed as generally indicated at 244. When desorption is complete, the output gas concentration will return to the initially set value as generally indicated at 246. A complete record of the gas concentrations is then used to determine the amount of gas adsorbed. In the representative example of FIG. 2, three different input gas concentrations (10%, 20% and 30% adsorptive gas) and associated output gas concentrations are illustrated.

1.2 Stepwise Change of Input Gas Concentration During Measurement Steps

Another measurement option according to embodiments of the present disclosure using the system of FIG. 1 provides a sample to be characterized in measurement cell kept at a temperature well above the dew point of the adsorptive gas, for example at room temperature. Output gas concentration is continuously monitored by one or more associated TCDs. The input gas concentration is chosen, set, and left constant. Typically, the input adsorptive gas concentration is set to 0%. The sample cell temperature is lowered, for example by immersing it into liquid nitrogen.

Figure 3:
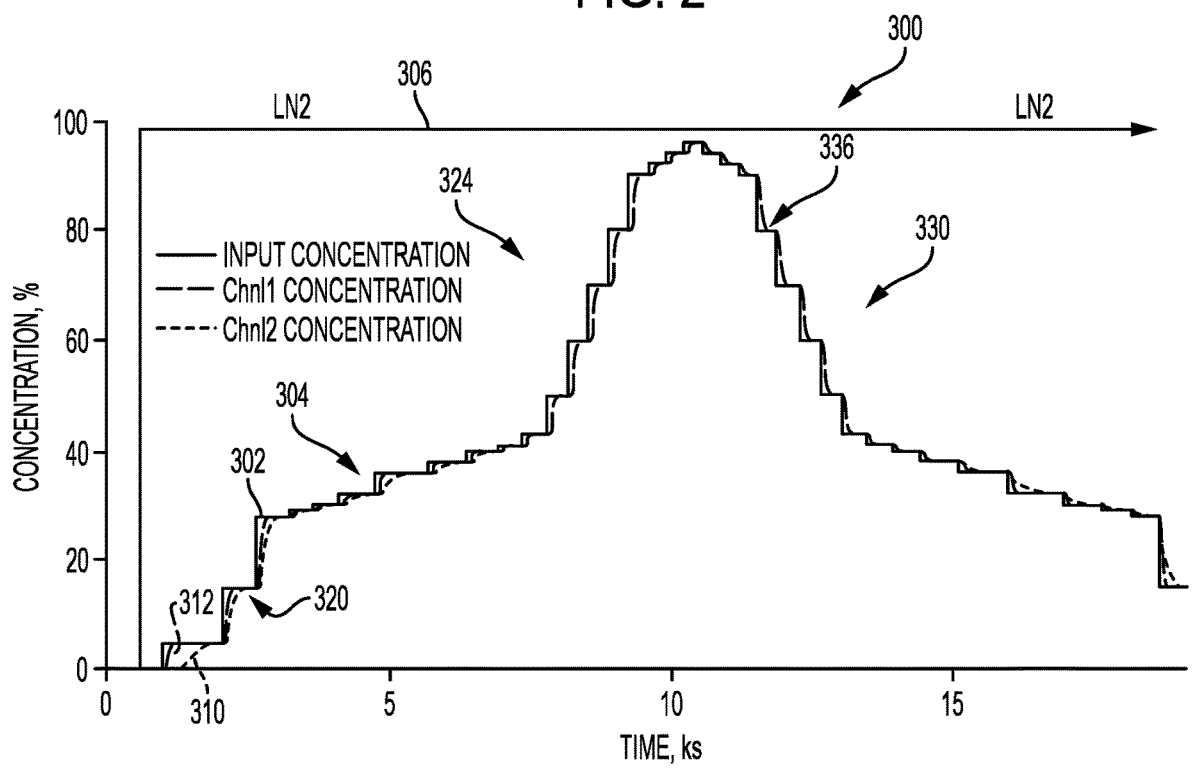
FIG. 3 is a graph illustrating a method for sample characterization using the system of FIG. 1 with a stepwise change in input gas concentration during each measurement step according to representative embodiments of the present disclosure.

FIG. 3 is a graph 300 illustrating a method for sample characterization using the system of FIG. 1 with a stepwise change in input gas concentration 302 during each measurement step 304 according to representative embodiments of the present disclosure. As illustrated in graph 300, the interval 306 marked with LN2 indicates when the temperature of the measurement cell is lowered, which spans the entire measurement period in this example. The temperature of the measurement cell(s) may be lowered by immersing in liquid nitrogen as previously described. Output adsorptive gas concentration is measured by associated detectors for a first flow path or channel 310 having a measurement cell containing a first amount of the sample material to be characterized, and a second channel 312 having a measurement cell containing a second amount of the sample material to be characterized. In the example graph 300, the measurement cell in the second flow path does not contain any of the sample material.

For each stepwise change in input adsorptive gas concentration, indicated generally as steps 304, the output gas concentration for the first and second channels is indicated by an associated TCD and recorded by the computer control system. The output gas concentration associated with any channel having a measurement cell containing the sample material will follow the change of the input gas concentration, with a delay proportional to the channel dead volume and the amount of adsorptive gas retained or released by the sample being measured as generally illustrated at graph 320, for example.

For an initial adsorptive gas concentration of 0% (pure carrier gas), the output gas concentration remains the same as the input gas concentration because there is no adsorptive gas for adsorption by the sample material. While the sample cell is still being cooled, such as by immersion in liquid nitrogen in this example, the adsorbate input gas concentration is increased stepwise to the target concentration of each measurement step with the change in output gas concentration measured. When adsorption is completed the output gas concentration will be substantially equal to the input gas concentration and the measurement continues with the next step increase in the input adsorptive gas concentration. The step sizes of the input gas concentration may vary over the course of the measurement depending on the particular application and implementation. Step sizes may be selected based on the sample material, adsorptive gas, the time required for completion of the adsorption at each concentration, estimated or expected size of pores in the sample material, etc. The amount of adsorbed gas is determined from the measurement of output gas concentration as a function of time. This process can be repeated for a number of steps and, throughout the measurement, the sample measurement cell is kept at low temperature. This provides accurate isotherm data even for high gas concentrations since the gradual stepwise increase in gas concentration reduces or eliminates plugging of pores by the adsorptive gas.

As shown in graph 300, the adsorptive gas concentration varies from 0% to near 100% during the adsorption portion of the measurement indicated generally at 324. The adsorptive gas concentration is then decreased stepwise in a similar manner as indicated generally at 330. The output gas concentration decreases at a slower rate than the input gas concentration due to desorption of the adsorptive gas from the sample material as generally indicated at 336 until the output gas concentration is substantially equal to the input gas concentration, at which time the measurement proceeds by stepwise decreasing the input gas concentration to the next lower measurement step.

Comparing the values associated with the measurement cell to the values associated with the reference cell containing a different amount of the same sample material as shown in the graph 300 of FIG. 3 facilitates discrimination between the amount of adsorptive gas contributing to the adsorption and/or desorption and the amount of adsorptive gas being retained/released by the dead volume due to the difference in mixture concentration at the beginning and the end of each adsorption/desorption measurement step. Using an empty reference cell, containing none of the sample material, is in most cases, a satisfactory option for this type of measurement as previously described. Various embodiments may measure the volume difference between the measurement cell and the reference cell before the measurement takes place, or as part of the measurement procedure. Alternatively, measurement cells with calibrated, known volumes can also be used. In some embodiments a reference cell is not used.

1.3 Continuous Change of Input Gas Concentration During Measurement

Figure 4:
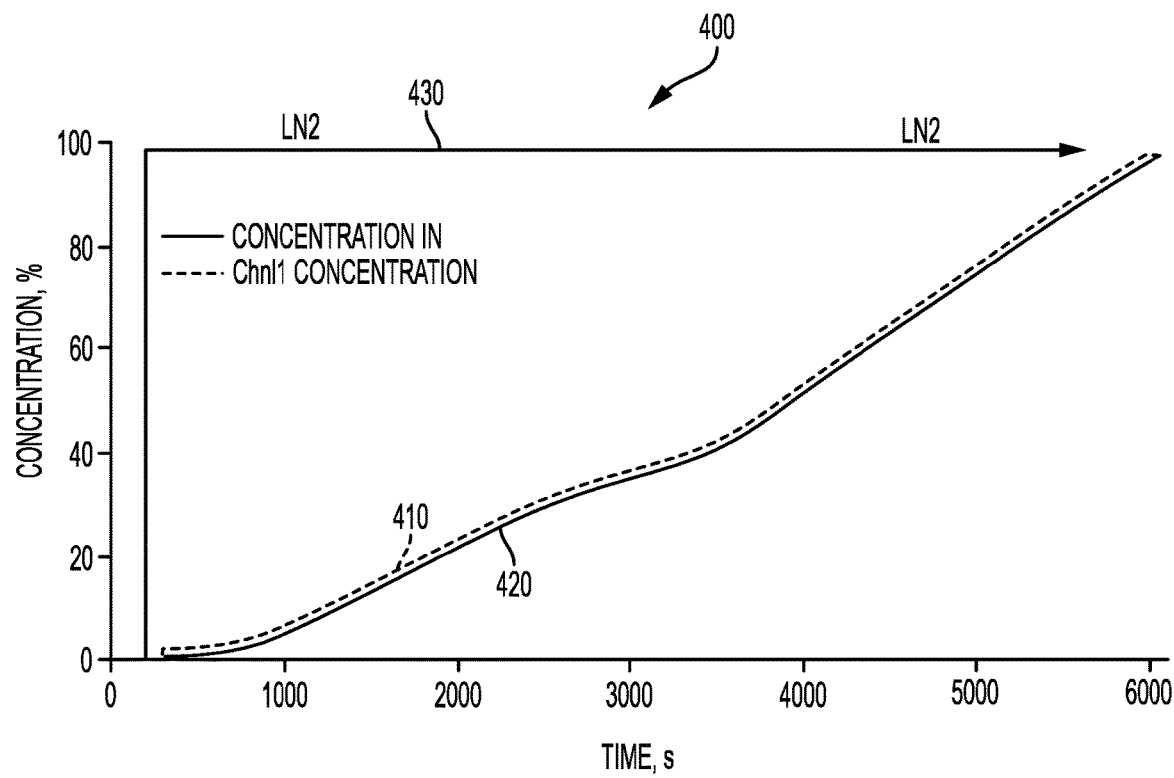
FIG. 4 is a graph illustrating a method for sample characterization using the system of FIG. 1 with a continuous change in put gas concentration during a measurement according to representative embodiments of the present disclosure.

FIG. 4 is a graph 400 illustrating operation of a method for sample characterization using the system of FIG. 1 with a continuous change of input gas concentration 410 while measuring output gas concentration 420 during a measurement according to representative embodiments of the present disclosure. In this measurement, the sample cell is first allowed to stabilize at a temperature well above the dew point of the adsorptive gas, for example at room temperature (not shown). The input adsorptive gas concentration is set to 0%. The sample cell temperature is then lowered, for example by immersing it into liquid nitrogen, as indicated by the interval 430 marked with LN2 to indicate when the sample cell temperature has been lowered. The output gas concentration is then measured by an associated sensor or detector, such as a TDC as previously described. While the measurement cell containing the sample material to be characterized is immersed in liquid nitrogen, the adsorptive gas concentration is continuously increased to ensure a constant (with time) concentration difference between the input gas concentration 410 and output gas concentration 420. The difference in concentrations may range from close to zero (for example 0.1%) to about 10% and is more often in the range from 0.5% to 2%. Graph 400 illustrates a measurement of a catalyst sample material with a 1.25% constant differential between input gas concentration 410 and output gas concentration 420. Alternatively, the adsorptive gas concentration can continuously increase/decrease following a predetermined curve. For example, a linear increase or decrease of input concentration may be used rather than a constant differential between the input and output gas concentrations. Either approach provides nearly continuous adsorption data for isotherm determination.

Figure 5:
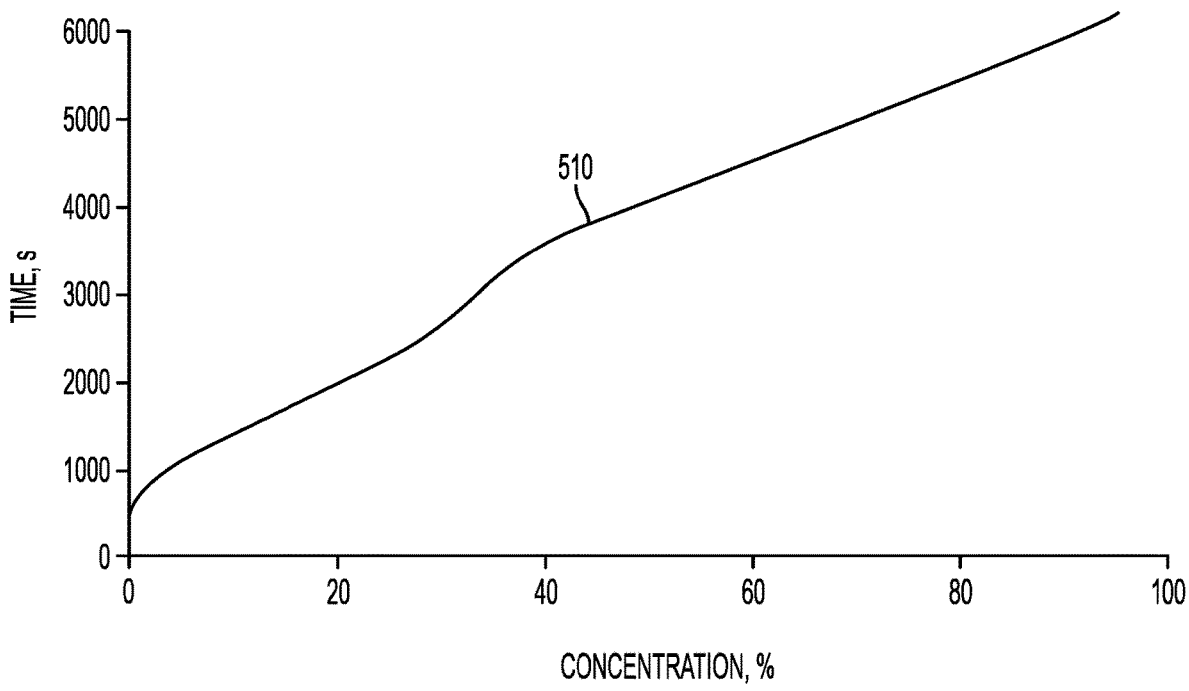
FIG. 5 is a graph illustrating a continuous isotherm extracted from a continuous change of input gas concentration using the system of FIG. 1 and the method of FIG. 4 according to representative embodiments of the present disclosure.

The constant concentration differential approach is very useful for quick evaluation of an unknown material, as the adsorption/desorption time spent at a given concentration corresponds to the amount of adsorbed/desorbed gas at that concentration. Therefore, the time vs. concentration graph of these measurements resembles the isotherm for the material as shown in FIG. 5. This information can be used to determine a more efficient set of target concentrations for a more detailed measurement and isotherm determination. For example, the constant concentration differential approach may be used to determine or select the input concentrations for a subsequent measurement using stepwise changes of the input concentration as described above.

FIG. 5 is a graph illustrating a continuous isotherm extracted from a continuous change of input gas concentration using the system of FIG. 1 and the method of FIG. 4 according to representative embodiments of the present disclosure. As illustrated in FIG. 5, isotherm 510 shows the time as a function of concentration for the sample material, which is a catalyst in this example.

2. Number of Channels

The number of channels or flow paths and the configuration of each of the channels used during measurements is another selectable factor that determines the nature of the measurement. Multiple channels can be used simultaneously for independent measurement of different samples. Alternatively, or in combination, one channel may be used as a reference for one or more other channel(s) to minimize dead volume effects.

2.1 Independent or Single Channel Measurement

Instrument throughput can be maximized by using each available channel for a different sample measurement. However, except in the case of constant input concentration measurement, this does require assumptions about the measurement cell and system dead volumes.

2.2 Use of Reference Channel in Other Channel Measurements

The measurement or sample cell and system dead volume effects can be substantially eliminated by using the information provided by two (or more) channels, with one channel functioning as a reference channel, and the other channels as measurement channels. Using a reference channel, it is possible to minimize or substantially eliminate the influence of the dead volume on the final measurements if all channels (including the reference channel) have substantially identical dead volumes. If one or more channels have dead volumes that are different from other channels, but the dead volume differences are known, the differences may be used to correct the final measurement results to improve accuracy.

For measurements having more than one measurement channel, the reference channel may be configured with an empty cell having a dead volume matching the measurement channels. For measurements having a single measurement channel, the reference channel may be configured with a cell having a different amount of the same sample material, or with an empty cell. For example, for a single measurement channel, the measurement cell may contain 1.5 grams of the sample material, and the reference cell may contain 0.5 grams of the same sample material. Alternatively, the reference cell could be empty.

The differential measurement method can be applied in combination with any of the measurement techniques used with the independent or direct measurement technique where the first and second measurement stations are used simultaneously to measure different amounts of the same sample. The measurement result of the measurement station containing less (optionally zero or none) of the sample material is subtracted from the measurement result obtained at the measurement station with more sample material. The final value is then divided by the difference of sample mass between the two stations. This method effectively eliminates the amount of adsorbate retained and released by the controlled volume. The instrument may be designed such that the controlled volumes of the two or more measurement stations are substantially equal or matched so that the corresponding terms cancel in the calculations (V1−V2=0). However, the technique is equally applicable where the controlled volumes differ.

The controller may perform various calculations using stored values obtained during system calibration in combination with measured values during the test to characterize the sample material, such as by generating an isotherm, for example. Basic equations used by the controller for a differential measurement may include the following:

$$N2_{1(Cout)} = \int_{tCoutStart}^{tCout} \left( MFin1 * \frac{(Cout1 - Cin)}{(1 - Cout1)} \right) dt - V1 * \int_{CoutStart}^{Cout} dCout \quad 12)$$

$$N2_{2}(Cout) = \int_{tCoutStart}^{tCout} \left( MFin2 * \frac{(Cout2 - Cin)}{(1 - Cout2)} \right) dt - V2 * \int_{CoutStart}^{Cout} dCout \quad 13)$$

$$N2_{(Cout)} = N2_{1(Cout)} - N2_{2(Cout)} \quad 14)$$

$$N2_{(Cout)} = \int_{tCoutStart}^{tCout} \left( MFin1 * \frac{(Cout1 - Cin)}{(1 - Cout1)} \right) dt - V1 * \int_{CoutStart}^{Cout} dCout - \int_{tCoutStart}^{tCout} \left( MFin2 * \frac{(Cout2 - Cin)}{(1 - Cout2)} \right) dt - V2 * \int_{CoutStart}^{Cout} dCout \quad 15)$$

-continued $$N2_{(Cout)} \approx \int_{tCoutStart}^{tCout} \left( \left( MFin1 * \frac{(Cout1 - Cin)}{(1 - Cout1)} \right) - \left( MFin2 * \frac{(Cout2 - Cin)}{(1 - Cout2)} \right) \right) dt \quad (16)$$

$$\frac{N2(Cout)}{m} = \frac{N2(Cout)}{m1 - m2} \quad (17)$$

where N2(Cout)/m in equation 17 represents the amount of adsorbate per unit mass retained and released by the measured sample at the concentration Cout.

3. Flow Arrangement and Related Calculations

Another selectable factor that determines the nature of the measurement is the configuration of the flow path or channel. Some of the calculations used to generate an isotherm based on the adsorption/desorption measurements depend on the configuration of the flow path selected for the measurement.

3.1 Close-Coupled Concentration Detector

Another measurement option is related to the configuration of the flow path or channel. Embodiments having a close-coupled concentration detector position the detector near the measurement or sample cell so that there is a relatively short time delay (typically up to a 10 second delay) for gas flowing between the measurement cell output and the concentration detector (e.g., TCD). In this case, the calculation uses equations that apply to the control volume tied to the measurement cell, where the calculation of the flow rate on the output of the measurement cell must be included in mass conservation equations. This mode allows faster measurement but the calculation of the results contains one more variable than the flow arrangement with a delay loop. In the representative system illustrated in FIG. 1, a close-coupled detector arrangement may be provided by controlling valve 150 so that the gas exiting measurement cells 130, 132 bypasses delay buffers 156, 158 and flows directly to detectors 152, 154.

3.2 Delay Loop Upstream of Detector

A delay loop or buffer may optionally be provided between the measurement cell and the concentration detector. In various embodiments, such as the representative embodiment illustrated in FIG. 1, a delay loop is selectively positioned in the flow path of one or more channels by controlling an associated valve. Depending on the particular application and implementation, the valve may be configured to selectively route gas through the delay loops for all channels or none of the channels. Alternatively, individual valves may be used for each measurement channel if desired. The length of the delay loop is selected to compensate for any flow rate fluctuation caused by an adsorption/desorption phase during a measurement step.

Calculations for determining the isotherm when the flow channel includes a delay loop use equations that apply to a control volume encompassing the gas mixture containing the entire adsorption/desorption step moving through the detector. The constant flow rate simplifies the calculations and generally provides more reliable results.

Combination of Measurement Options

The previously described measurement options can be combined as desired for particular applications to characterize a sample material. For example, a measurement using the stepwise change or continuous change of input gas concentration method may begin with a constant input gas concentration, usually 0% although other concentrations are possible for particular applications. After the concentration is stabilized at the target value as previously described, the temperature of the measurement cell and sample mater is lowered and the output concentration is monitored until it reaches the input concentration. The continuous input concentration measurement is completed before proceeding with stepwise or continuous input concentration measurement as previously described.

System Calibration

System calibration may include calibration or adjustment of control signals and/or characterization of various components for use in calculations to improve accuracy and precision of measurement results. System calibration may include adjustment or characterization of the channel flow rates by associated calibration or adjustment of mass flow controllers and meters, valves, mixer, capillary tubes, etc. as well as determination or measurement of dead volumes associated with each channel or flow path. Detector calibration will depend on the particular detector design. A representative detector calibration method for a TCD is illustrated and described with reference to FIGS. 6A and 6B. System calibration may include operating the system using empty measurement cells having known, different volumes in sequentially for each channel. This allows measurement or characterization of MFC flow rates, mixer operation, capillary tube balance, and time correlation between the mixer output and detector response. For multi-channel instruments, all channels can be calibrated at the same time (given sufficient empty cells with known volumes).

FIGS. 6A-6B illustrate detector calibration for a representative thermal conductivity detector according to embodiments of the present disclosure. Graph 600 illustrates a calibration or characterization procedure that provides a mixture having a stepwise increasing concentration of adsorptive gas 610 and corresponding TCD signal 620 for a number of predetermined input gas concentration target values. The procedure is performed without any sample material in the measurement cells so that no adsorption/desorption occurs and the output gas concentration is equal to the input gas concentration after stabilization. The slope of the detector signal after a change in concentration value, or alternatively the time required for the detector signal to follow the stepwise increase in concentration may be used to characterize or measure the detector response time. Similarly, the time from the change in input concentration to when the detector signal begins to increase may be used to measure or characterize the system transport delay for the gas mixture to travel from the output of the mass flow controllers to the input of the detector.

While a representative number of target concentrations and equally spaced values are illustrated in FIG. 6A, a different number of target values may be used depending on the particular application and implementation. Similarly, the detector may be calibrated or characterized over a smaller range of values with a greater number of values to provide more accurate calibration of the detector for a specific measurement. Similarly, more target values for ranges where the detector or other components of the system exhibit a different response.

As shown in FIG. 6A, graph 600 illustrates a calibration measurement where the concentration of adsorptive gas 610 relative to the adsorbate/carrier mixture is controlled and stabilized to a number of predetermined target percentages or values ranging from pure carrier gas (concentration of 0) to pure adsorptive gas (concentration of 1.0). The selected concentration values in this example are: 0.0, 0.1, 0.2, 0.3, 0.4, 0.5, 0.6, 0.7, 0.8, 0.9 and 1.0. The concentration value is calculated using an associated mass flow controller and mass flow meter for the channel/detector being calibrated.

The concentration target value is recorded or stored in memory along with the corresponding value associated with the signal from the thermal conductivity detector. Representative pairs of values are shown in Table 1 below. Actual voltages for the TCD detector signal may vary depending on the particular filament, housing, flow rate, etc. for a particular instrument.

The calibration data may be used to determine calibration curve parameters and a calibration curve may be generated using an appropriate curve fitting algorithm (in this case, coefficients of a fitting polyline are obtained). FIG. 6B illustrates a graph 650 having a calibration curve 660 generated using a curve fitting algorithm to fit the detector signal values for each calibration concentration value generally indicated by reference numeral 654. Those of ordinary skill in the art will recognize that the curve fitting algorithm may be selected to provide desired accuracy relative to the recorded calibration data for a particular application. Alternatively, one or more interpolation or extrapolation strategies or algorithms may be used to correlate TCD detector voltage measurements with a corresponding mixture concentration for data between or near calibration points. More calibration points may be obtained to provide additional data for use in subsequent measurements. Likewise, TCD voltages for a particular calibration point may be averaged or otherwise statistically combined over multiple calibration cycles depending on the particular application and implementation.

TABLE 1

| Point | Mixture Concentration | TCD Detector Signal |
|---|---|---|
| 0 | 0 | −5.20862 |
| 1 | 0.104568 | −4.02706 |
| 2 | 0.203156 | −3.0722 |
| 3 | 0.302002 | −2.24027 |
| 4 | 0.400919 | −1.5052 |
| 5 | 0.499989 | −0.845487 |
| 6 | 0.599139 | −0.241455 |
| 7 | 0.6984 | 0.319785 |
| 8 | 0.797783 | 0.848884 |
| 9 | 0.897125 | 1.35508 |
| 10 | 1 | 1.86246 |

During a subsequent measurement process for characterizing a sample material, the calibration curve 660 or associated curve fitting equation may be used for the target values of the measurement process. The calibration curve may be used to match the start and end values of the saved mass flow meter signals for the particular measurement step being performed. Using this updated calibration curve equation (or a corresponding numerical method), any measured TCD signal value can be directly converted to the concentration of the mixture currently flowing through the TCD detector, with accuracy corresponding to the accuracy of the utilized MFC devices.

Figure 7:
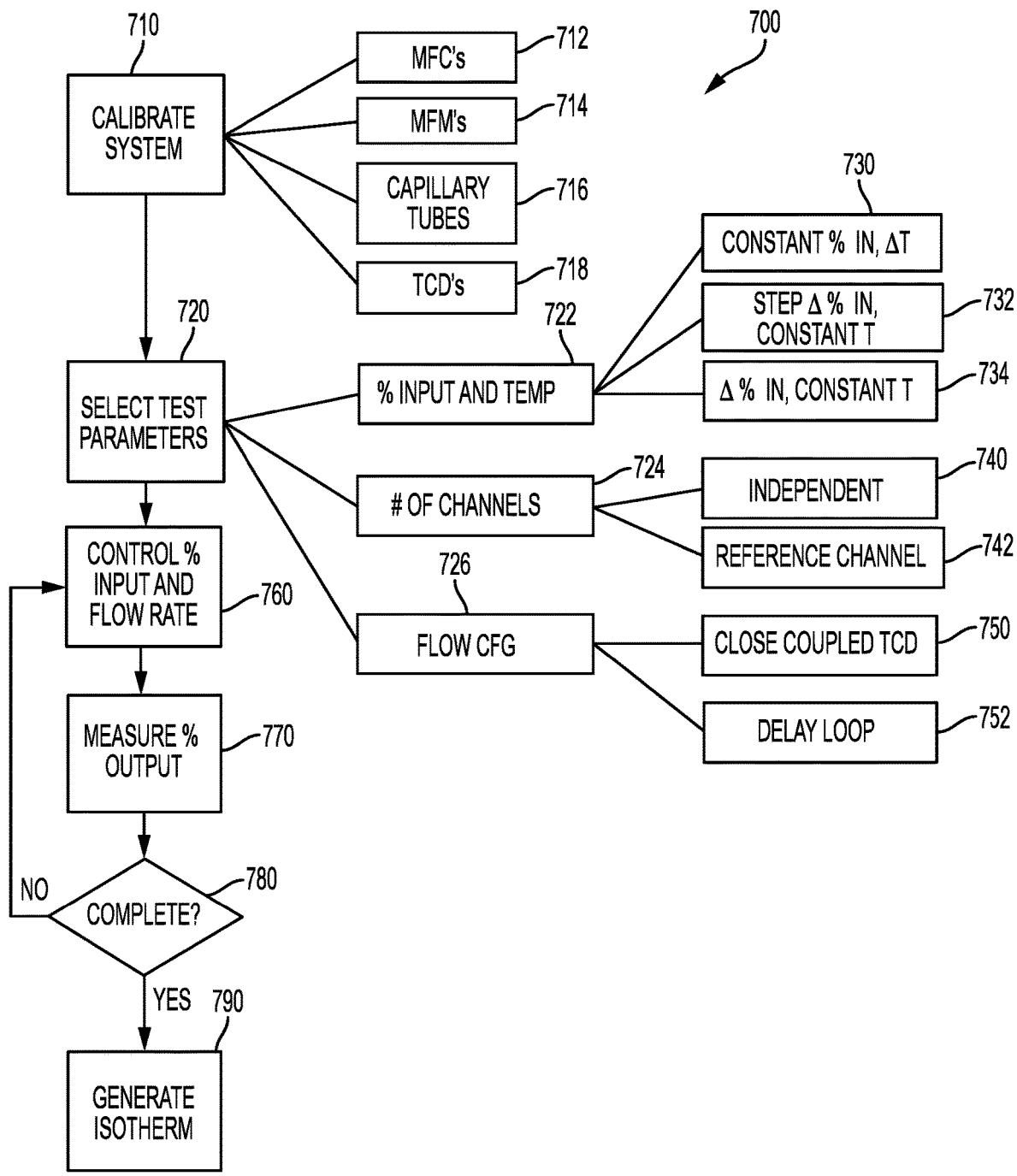
FIG. 7 is a flow chart illustrating operation of a system or method for sample characterization according to representative embodiments of the present disclosure.

FIG. 7 is a flow chart illustrating operation of a system or method for sample characterization according to representative embodiments of the present disclosure. As previously described, the control strategy or algorithm illustrated in the flowchart 700 of FIG. 7 may be implemented by a programmed microprocessor or controller executing instructions stored in a non-transitory computer readable medium. The control strategy or algorithm illustrated in FIG. 7 may be implemented by one or more controllers or programmed computers using one or more processing strategies such as event-driven, interrupt-driven, multi-tasking, multi-threading, and the like. As such, various steps or functions illustrated and described in FIG. 7 may be performed in the sequence illustrated, in parallel, in a different sequence, or in some cases omitted. Although not always explicitly illustrated, one of ordinary skill in the art will recognize that one or more of the illustrated steps or functions may be repeatedly performed depending upon the particular processing strategy being used and the measurement being performed, for example. Similarly, the order of processing is not necessarily required to achieve the features and advantages described, but is provided for ease of illustration and description. The control logic may be implemented primarily in software executed by a microprocessor-based controller or computer configured to perform the illustrated task or function. Of course, the control logic may be implemented in software, hardware (including firmware), or a combination of software and hardware in one or more controllers or processors depending upon the particular application. When implemented in software, the control logic may be provided in one or more non-transitory computer-readable storage devices or media having stored data representing code or instructions executed by a processor or computer.

As illustrated in FIG. 7, control strategy 700 includes system calibration 710, which may include calibration or measurement/characterization of mass flow controllers 712, mass flow meters 714, capillary tubes or other flow controllers 716, concentration detectors 718, and the like. As those of ordinary skill in the art will appreciate, calibration or characterization may be used in subsequent measurements to adjust values obtained by various components, or to more precisely control various components, for example.

A system or method according to the present disclosure may also include selection of measurement or test parameters 720. Measurement or test parameters may be selected by a user via a corresponding user interface, such as a keyboard, touchscreen, voice recognition, barcode, mouse, etc. Alternatively, or in combination, measurement or test parameters may be associated with a particular type or category of measurement or test such that multiple parameters are determined by designation or selection of the particular type or category of measurement or characterization. Representative embodiments may include designation or selection of input adsorptive gas concentrations and flow as well as sample temperature variation 722, the number of measurement channels 724, and the flow configuration or arrangement 726.

Input adsorptive gas concentration control and sample temperature 722 may include options such as a constant input adsorptive gas concentration with two or more sample temperatures as represented at 730, stepwise changes in input adsorptive gas concentration with constant sample temperature as represented at 732, and continuously changing input adsorptive gas concentration with constant sample temperature as represented at 734.

As also illustrated in FIG. 7, the number of channels may be selected or determined as indicated at 724 to provide an individual or independent measurement of the sample using a single measurement channel as indicated at 740, or multiple measurement channels as indicated at 742. When multiple measurement channels are selected or designated, a reference measurement channel may be used that contains a different amount of the sample material as previously described. The reference channel may include an empty measurement or sample cell that does not contain any of the sample material to be characterized.

Measurement or test parameter selection may also include selection of a flow arrangement or configuration as indicated at 726, which may include a close-coupled configuration with an adsorption gas concentration detector positioned directly downstream of the sample cell as indicated at 750. Alternatively, the measurement channel configuration may include a delay loop as indicated at 752.

After selection or determination of test parameters as represented at 720, the measurement or characterization of the sample continues at 760 with controlling the mass flow of a carrier gas and an adsorptive gas to provide a mixture having a target concentration of the adsorptive gas based on the selected test parameters. The output adsorptive gas concentration downstream of the sample (or reference cell, which may contain a different amount of the sample material or none of the sample material) is measured by an associated concentration detector as represented at 770.

The input adsorptive gas concentration is controlled based on the selected measurement parameters and the output adsorptive gas concentration downstream of the sample is measured until the measurement or characterization is complete as represented at 780. This may include varying of the input adsorptive gas concentration in the mixture and/or varying temperature of the sample during one or more measurement steps, or continuously varying the input adsorptive gas concentration as previously described.

When the measurement has been completed as represented at 780, the sample may be characterized based on the adsorption/desorption of the adsorptive gas by the sample during the measurement as represented at 790. In various embodiments, the sample may be characterized by determination of an isotherm.

Figures 8A, 8B:
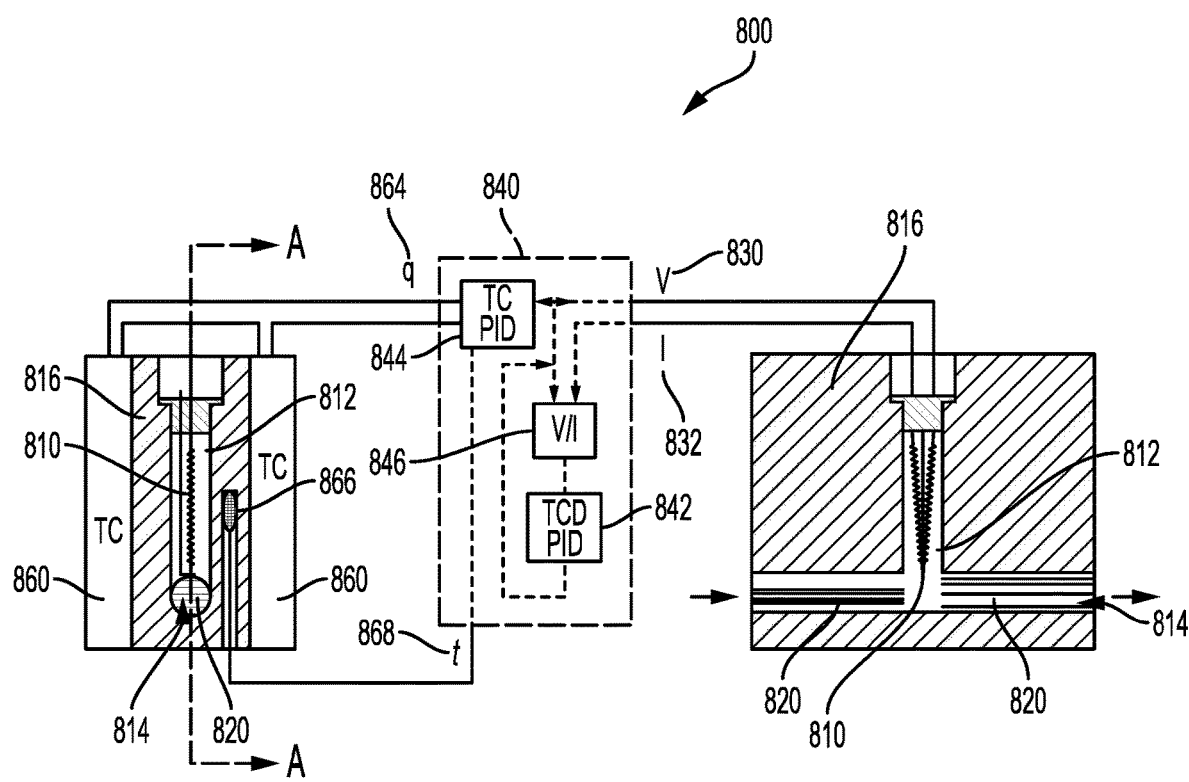
FIGS. 8A and 8B illustrate a representative thermal conductivity detector and associated control system according to representative embodiments of the present disclosure.

FIGS. 8A and 8B illustrate a representative thermal conductivity detector and associated control system according to representative embodiments of the present disclosure. FIG. 8B is a cross-section taken along line A-A of FIG. 8A. Detector system 800 includes a thermal conductivity detector (TCD) that is built and calibrated to provide accurate and repeatable measurements of the gas mixture concentrations for both static and dynamic concentration conditions, i.e. gas flow with constant concentration and with changing concentrations, respectively. Gas concentration is determined by measuring gas thermal conductivity, which is a function of gas composition. As described in greater detail below, detector system 800 reduces or eliminates any contribution from convective and radiative heat transfer so that substantially all heat transfer between the TCD filament and the flowing gas mixture is associated with conductive heat transfer. In various embodiments, this results in concentration sensitivity of the detector of 100 ppm or better, which corresponds to partial pressures of 0.01% of the total pressure or less.

As illustrated in FIGS. 8A and 8B, detector system 800 includes a detector filament 810 disposed within a closed-end branch or filament cavity 812 of the T-shaped cavity, passage, or channel 814 within detector housing 816. In one embodiment, detector filament 810 is a tungsten filament, such as the GOW-MAC 64 Ohm, high sensitivity filament, type W2X, made from Rhenium-Tungsten alloy wire. The particular filament material, size, construction, etc. may vary depending on the particular application and implementation. The detector housing 816 is kept at a constant temperature using any of a number of strategies that may include a thermoelectric heat pump, such as a Peltier device, liquid heating/cooling, resistive heating, etc. In one embodiment, a Peltier device is controlled by a closed loop controller to maintain detector housing 816 at a constant temperature as described in greater detail below. Detector housing 816 may be constructed from various materials depending on the particular application and implementation. Both aluminum and stainless steel are known to work well for detector housing 816 despite the widely varying thermal characteristics of these materials.

The gas mixture flow is controlled to flow through channel 814 at a low flow rate, such as between 5-50 $cm^3/min$, for example. In one embodiment, the flow rate is maintained between 10-30 $cm^3/min$. Flow channel 814 may include a tube or insert having a flow conditioner 820 to reduce or eliminate turbulence and provide substantially laminar flow of the gas mixture through the flow channel 814. For example, the flow conditioner may include a fine comb or honeycomb insert extending along some portion of the gas flow channel to induce laminar flow past the filament cavity 812. As such, migration of gas into filament cavity 812 is primarily due to diffusion so that convective heat transfer is negligible due to little or no flow of the gas mixture into the closed filament cavity. As such, gas thermal conductivity will dominate the heat transfer from the filament to the cavity walls of housing 816.

Electrical resistance of filament 810 will vary with temperature depending on the material and construction of filament 810. Heating power supplied to filament 810 is varied by controlling the voltage (V) 830 applied to the filament 810. The filament temperature is determined indirectly by monitoring the filament voltage and measured current to determine the instantaneous resistance of the filament, which corresponds to the filament temperature.

In various embodiments, filament temperature control is achieved with standard control strategies that may be implemented with analog electronics and/or computer or microcontroller control algorithms, the latter providing more flexibility. Control strategies may include open-loop and/or closed-loop strategies that may include feedback, feedforward, and/or hybrid strategies. Embodiments may include proportional-integral-derivative (PID) based algorithms or other algorithms such as Dahlin's method, for example.

In operation, controller 840 includes one or more control algorithms to maintain a substantially constant temperature of filament 810 at a first temperature and to maintain a substantially constant temperature of housing 816 at a second temperature. Controller 840 may include a TCD PID control algorithm 842 and a TC PID control algorithm 844. The TCD PID control algorithm 842 controls the filament temperature using the measured ratio of V/I 846 as the controlled variable. The ratio V/I 846 corresponds to the resistance of the filament, which varies as a function of filament temperature as previously described. The ratio V/I 846 is determined by the TCD voltage (V) 830 divided by the measured TCD current (I) 832. The filament setpoint temperature or corresponding setpoint resistance is selected to balance factors such as filament life (longer with lower temperatures) and sensitivity to gas mixture concentration changes (more sensitive with higher temperatures). In one representative embodiment, the target or setpoint V/I ratio 846 is selected to maintain a constant filament temperature of about 490 K. Various embodiments may include filament temperature setpoints between about 400 K-600 K.

In one or more embodiments, detector housing 816 is also maintained at a constant setpoint temperature using a temperature regulator (TC) 860 as previously described to reduce or eliminate the effect of radiative heat transfer on the gas concentration measurements. The housing setpoint temperature is generally much lower than the filament temperature to maximize detector sensitivity (which increases with increasing temperature differential between the housing wall and the filament 810. Controller 840 may include one or more control algorithms, such as a TC PID control algorithm 844 to maintain a constant housing temperature. The TC PID may be used to control a thermoelectric heat pump, such as a Peltier device, for example. Temperature control can also be achieved with liquid cooling, resistive heating, or other approaches depending on the particular application and implementation.

In one embodiment, TC PID control algorithm 844 cooperates with TCD PID 842 to provide feedforward control of temperature regulator 860. The feedforward input to TC PID control algorithm 844 may be provided by the voltage (V) 830 supplied by TCD PID 842 for filament 810 to control the voltage (q) 864 provided to the temperature regulator (TC) 860. The TC PID controller 840 operates to control the temperature of housing 816 with feedback provided by a temperature sensor 866 that generates a corresponding temperature signal (t) 868, which corresponds to the housing temperature. The change in the TCD control signal (V) 830 corresponds to the change in the amount of energy released from the detector filament 810. This energy change would cause an associated change in the detector housing temperature without active control of the housing temperature by temperature regulator (TC) 860. As such, detector system 800 provides the filament signal voltage (V) 830 simultaneously to the TC PID controller 844 as a feedforward input to reduce latency and improve system response time, rather than waiting to respond to the housing temperature feedback signal from temperature sensor 866. As such, any temperature fluctuations of housing 816 (signal t fluctuation) can be substantially reduced or eliminated.

Prototype instruments have demonstrated that temperature of housing 816 can be maintained within 0.1° C. or less of the setpoint temperature using a Peltier device for the temperature regulator (TC) 860 and a control strategy as described herein. The TCD housing setpoint is generally much lower than the filament temperature setpoint to maximize detector sensitivity (which increases with increasing temperature difference between the housing wall and the filament). For most applications, the lower limit is generally the dew point of the ambient environment. A setpoint of 10° C. to 30° C. is usually acceptable. Empirical data indicates that in one prototype instrument, a housing temperature of 17° C. is close to ideal.

Representative data demonstrates that the temperature of the housing may be maintained within a band of about 0.04° C., corresponding to a correction in filament voltage of 0.00095V. This substantially eliminates the detector signal drift. The benefit of the temperature stability of all components of the detector is twofold. First, the heat transfer between detector filament and housing due to radiation or radiative heat transfer is constant, and therefore its effects on the measurement can be subtracted and eliminated. Second, the energy transfer is primarily due to the change of gas conductivity, in this case uniquely determined by gas mixture concentration, as there is no energy needed for the temperature change of the filament. This provides a rapid response to concentration changes in the gas mixture that is superior to various prior art approaches. Thus, the detector can be calibrated using constant concentrations and flow rates and subsequently used in both static and dynamic flow conditions (as long as substantially laminar flow is maintained to minimize convective heat transfer).

As described in detail above, detector system 800 determines the thermal conductivity of the gas mixture by continuously adjusting the power applied to the TCD filament to maintain a constant filament temperature. The applied power required to maintain constant temperature is therefore associated with the heat lost by the filament due to conductive heat transfer to the flowing gas mixture. Due to the arrangement of the filament within a closed-branch relative to the gas flow channel, convective heat transfer is negligible. Since filament temperature and housing wall temperature are kept effectively constant by the arrangement and control strategies of various embodiments, radiative heat transfer is also constant and readily subtracted. Thus, the applied heating power is a sensitive function of gas thermal conductivity and therefore the gas concentration. This facilitates swift and precise measurements of the mixture concentration across the entire range of concentrations from 0 (0%) (pure carrier gas) to 1 (100%) (pure adsorptive gas) in static, as well in dynamic concentration and flow conditions.

As illustrated in the Figures and described above, one or more embodiments according to the present disclosure directly measure the amount of adsorbed/desorbed adsorbate by the sample material using a flowing gas mixture that address various deficiencies and solves various problems associated with prior art flowing gas techniques. These may include directly and accurately controlling and changing mixture flow rate and concentration using a high accuracy and repeatability gas mixer over the entire time needed for the adsorption/desorption to complete, as well as determining an absolute measurement of adsorbate, which is usually small compared to the amount of adsorptive gas flowing through the measurement cell during the adsorption/desorption measurement. One or more embodiments also facilitate discrimination between the amount of adsorptive gas contributing to the adsorption and/or desorption and the amount of adsorptive gas being retained/released by the dead volume, due to the difference in mixture concentration at the beginning and the end of an adsorption/desorption measurement step.

One or more embodiments incorporate a closed loop feedback control system having electronic mass flow controllers (MFC's) with feedback provided by associated mass flow meters (MFM's) in the representative configurations described herein to facilitate mixing of the adsorptive gas and the carrier gas at any concentration between 0% (pure carrier gas) and 100% (pure adsorptive component) with an accuracy and repeatability of 0.1% or better.

Use of a high accuracy and precision (0.1% or better accuracy and repeatability) TCD or other detector technology, such as optical absorption detection, improves accuracy and repeatability across the entire isotherm measurement to provide performance meeting or exceeding state of the art static volumetric techniques. The TCD as described herein is substantially sensitive only to the mixture concentration and provides substantially instantaneous response to changes in concentration. This assures that the measurement signals obtained in static and dynamic concentration conditions are substantially the same. The accuracy and repeatability of the TCD typically matches or exceeds that of the gas mixer.

For embodiments incorporating differential measurements, comparing the values associated with the measurement cell to the values associated with a reference cell containing a different amount of the same sample material facilitates discrimination between the amount of adsorptive gas contributing to the adsorption and/or desorption and the amount of adsorptive gas being retained/released by the dead volume due to the difference in mixture concentration at the beginning and the end of an adsorption/desorption measurement step. Using an empty reference cell, containing none of the sample material, is in most cases, a satisfactory option for this type of measurement. Various embodiments may measure the volume difference between the measurement and the reference cell before the measurement takes place, or as part of the measurement procedure. Alternatively, cells with calibrated, known, volumes can also be used. In some applications and implementations a reference cell is not used.

While representative embodiments are described above, it is not intended that these embodiments describe all possible forms of a system or method for surface characterization of porous solids and powder materials according to the present disclosure. The words used in the specification are words of description rather than limitation, and it is understood that various changes may be made without departing from the spirit and scope of the disclosure. As previously described, the features of various representative embodiments may be combined in ways that are not explicitly illustrated or described to form further embodiments. While various embodiments may have been described as providing advantages or being preferred over other embodiments or prior art implementations with respect to one or more desired characteristics, as one of ordinary skill in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, operation, etc. Any embodiments described herein as less desirable than other embodiments or prior art implementations with respect to one or more characteristics are not outside the scope of the disclosure and may be desirable for particular applications.

What is claimed is:

1. A method for characterization of a porous solid or powder sample using flowing gas, the method comprising, by a controller:
   controlling mass flow of a carrier gas and an adsorptive gas to form a mixture having a target concentration of the adsorptive gas over the sample;
   determining adsorptive gas concentration based on signals from a detector disposed downstream of the sample;
   automatically repeating the controlling and determining steps for a plurality of different target concentrations; and
   generating an isotherm for the sample based on the adsorptive gas concentration for the plurality of different target concentrations.

2. The method of claim 1 further comprising:
   immersing the sample in liquid nitrogen to cool the sample for at least a portion of each of the different target concentrations.

3. The method of claim 2 wherein the sample is immersed in liquid nitrogen for all of the different target concentrations.

4. The method of claim 1 wherein the target concentrations vary from less than 5% to greater than 95%.

5. The method of claim 4 wherein the target concentrations vary in a stepwise manner.

6. The method of claim 1 further comprising:
   flowing the mixture through a sample cell containing none of the sample; and
   determining adsorptive gas concentration downstream of the sample cell based on signals from one of a second detector disposed downstream of the sample cell and the detector disposed downstream of the sample, wherein generating the isotherm comprises subtracting measurements associated with the sample cell containing none of the sample from measurements associated with the adsorptive gas concentration based on signals from the detector disposed downstream of the sample.

7. The method of claim 1 further comprising cooling the sample before determining the adsorptive gas concentration.

8. The method of claim 7 further comprising warming the sample after determining the adsorptive gas concentration before automatically repeating the controlling and determining steps.

9. The method of claim 8 wherein warming comprises warming the sample to room temperature.

10. A method for characterization of a porous solid or powder sample using flowing gas, the method comprising, by a controller:
    controlling mass flow of a carrier gas and an adsorptive gas to form a mixture having a target concentration of the adsorptive gas over the sample;
    cooling the sample;
    determining adsorptive gas concentration based on signals from a detector disposed downstream of the sample;
    automatically repeating the controlling and determining steps for a plurality of different target concentrations; and
    generating an isotherm for the sample based on the adsorptive gas concentration for the plurality of different target concentrations wherein controlling the mass flow of the carrier gas and the adsorptive gas comprises adjusting the mass flow of the carrier gas and the adsorptive gas to form a mixture having a target concentration that maintains a constant concentration difference between the concentration of the adsorptive gas flowing over the sample and the adsorptive gas concentration determined by the detector disposed downstream of the sample.

11. The method of claim 10 wherein the constant concentration difference is between 0.1% and 10%.

12. The method of claim 11 wherein the constant concentration difference is between 0.5% and 2%.

13. The method of claim 1 further comprising selectively routing the mixture through a delay loop after passing over the sample and before reaching the detector.

14. A method for characterization of a porous solid or powder sample using flowing gas, the method comprising:
    controlling, by at least one associated controller, mass flow of a carrier gas and mass flow of an adsorptive gas through a mixer to form a mixture and delivering the mixture having a target concentration of the adsorptive gas to a sample cell containing a predetermined amount of the sample;
    selectively cooling the sample cell to a first predetermined temperature;
    measuring concentration of the adsorptive gas downstream of the sample cell; and
    repeating the steps of controlling, selectively cooling, and measuring for a plurality of target concentrations of the adsorptive gas to characterize the sample.

15. A method for characterization of a porous solid or powder sample using flowing gas, the method comprising:
    controlling, by at least one associated controller, mass flow of a carrier gas and mass flow of an adsorptive gas through a mixer to form a mixture and delivering the mixture having a target concentration of the adsorptive gas to a sample cell containing a predetermined amount of the sample;

selectively cooling the sample cell to a first predetermined temperature;

measuring concentration of the adsorptive gas downstream of the sample cell; and repeating the steps of controlling, selectively cooling, and measuring for a plurality of target concentrations of the adsorptive gas to characterize the sample, wherein measuring concentration of the adsorptive gas downstream of the sample cell comprises:

positioning a concentration detector having a housing and a filament within the housing downstream of the sample cell;

heating the housing to a first setpoint temperature; and heating the filament to a second setpoint temperature higher than the first setpoint temperature.

16. The method of claim 15 further comprising controlling a valve to route the mixture exiting the sample cell to either the concentration detector or a delay loop.

17. The method of claim 14 further comprising controlling the mass flow of the carrier gas and mass flow of the adsorptive gas to vary the target concentration of the adsorptive gas in the mixture from 0% to 100% during the characterization of the sample.

18. The method of claim 14 further comprising selectively warming the sample to a second predetermined temperature after measuring the concentration of the adsorptive gas at the first predetermined temperature and measuring the concentration of the adsorptive gas at the second predetermined temperature before repeating the steps of controlling, selectively cooling, and measuring.

19. The method of claim 14 wherein the step of repeating comprises controlling the mass flow of the carrier gas and mass flow of the adsorptive gas to form mixtures having a first plurality of monotonically increasing target concentrations followed by mixtures having a second plurality of monotonically decreasing target concentrations.

20. A method for surface characterization of a porous solid or powder sample using flowing gas, the method comprising, by at least one programmable controller:

controlling a first mass flow controller to deliver a controllable mass flow of a carrier gas;

controlling a second mass flow controller to deliver a controllable mass flow of an adsorptive gas;

mixing the carrier gas and adsorptive gas from the first and second mass flow controllers and delivering an associated mixture to at least a first measurement channel containing a sample cell having a predetermined amount of the sample;

measuring concentration of the adsorptive gas downstream of the sample cell; and varying a target concentration of the adsorptive gas in the mixture delivered to the sample cell to determine an amount of the adsorptive gas adsorbed and desorbed by the sample for each target concentration to provide surface characterization of the sample.

21. The method of claim 20 varying the target concentration comprises varying the target concentration from 0% to greater than 95%.

22. The method of claim 21 wherein varying the target concentration comprises varying the target concentration in a stepwise manner.

23. The method of claim 20 further comprising cooling the sample cell prior to delivering the associated mixture.

24. The method of claim 23 wherein cooling the sample cell comprises immersing the sample cell in liquid nitrogen.

25. The method of claim 23 further comprising warming the sample cell after measuring the concentration of the adsorptive gas and remeasuring the concentration of the adsorptive gas after warming the sample cell.

26. The method of claim 25 wherein warming the sample cell comprises exposing the sample cell to room temperature.

27. A method for surface characterization of a porous solid or powder sample using flowing gas, the method comprising, by at least one programmable controller:

controlling a first mass flow controller to deliver a controllable mass flow of a carrier gas;

controlling a second mass flow controller to deliver a controllable mass flow of an adsorptive gas;

mixing the carrier gas and adsorptive gas from the first and second mass flow controllers and delivering an associated mixture to at least a first measurement channel containing a sample cell having a predetermined amount of the sample;

measuring concentration of the adsorptive gas downstream of the sample cell; and varying a target concentration of the adsorptive gas in the mixture delivered to the sample cell to determine an amount of the adsorptive gas adsorbed and desorbed by the sample for each target concentration to provide surface characterization of the sample, wherein measuring concentration of the adsorptive gas in the mixture comprises:

flowing the mixture through a detector housing containing a filament;

controlling temperature of the detector housing to a first temperature; and controlling temperature of the filament to a second temperature above the first temperature.

28. The method of claim 27 wherein controlling temperature of the detector housing comprises heating the detector housing.

* * * * *